United States Patent [19]

Ehresmann

[11] Patent Number: 4,485,012
[45] Date of Patent: Nov. 27, 1984

[54] ADJUSTABLE MAGNETIC WATER TREATMENT SYSTEM

[76] Inventor: Ewald Ehresmann, Manly, Iowa 50456

[21] Appl. No.: 408,149

[22] Filed: Aug. 16, 1982

[51] Int. Cl.³ .......................... C02B 1/34; B03C 1/30
[52] U.S. Cl. .................................. 210/223; 210/222; 204/307
[58] Field of Search .............. 210/222, 223, 695, 243, 210/259, 252, 295, 288, 388, 738, 748; 204/307; 335/305, 243, 252; 55/3, 100; 209/232

[56] References Cited

U.S. PATENT DOCUMENTS

| 1,975,306 | 10/1934 | Yates | 210/288 |
| 2,482,727 | 9/1949 | Culligan | 210/288 |
| 2,648,636 | 8/1953 | Ellis et al. | 210/223 |
| 2,708,245 | 5/1955 | Werner | 335/252 |
| 3,838,773 | 10/1974 | Kolm | 210/388 |
| 4,065,386 | 12/1977 | Rigby | 210/695 |
| 4,347,133 | 8/1982 | Brigante | 210/223 |

FOREIGN PATENT DOCUMENTS

| 25940 | of 1907 | United Kingdom | 210/223 |
| 351788 | 9/1972 | U.S.S.R. | 210/222 |

Primary Examiner—Richard V. Fisher
Assistant Examiner—John W. Czaja
Attorney, Agent, or Firm—Zarley, McKee, Thomte, Voorhees & Sease

[57] ABSTRACT

A water treatment system is described comprising a first water line in communication with a source of water at one end and a water filter on the other. An alternating current magnetic means is imposed with the first water line so that water flowing therethrough will be subjected to the magnetic field thereof. A second water line extends from the water filter to a water outlet means. A direct current magnet means is imposed in the second water line so that water flowing therethrough will be subject to the magnetic field thereof. The magnet means are comprised of coils imposed in a housing, a first shaft extends through the coil and is adjustably secured to the housing. The inner end of the shaft terminates in a plate means which is normally positioned adjacent inlet and outlet openings in the housing. A second shaft means is adjustably secured to the housing and its inner end terminates in a plate means which is oppositely disposed from the first mentioned plate means. The adjustable positions of the plate means influence the mechanical vibrations imposed on the water flowing from the inlet opening to the outlet opening.

10 Claims, 3 Drawing Figures

4,485,012

ADJUSTABLE MAGNETIC WATER TREATMENT SYSTEM

BACKGROUND OF THE INVENTION

Water systems have heretofore been influenced by electromagnetic means for purposes of improving the quality of the water therein. Some of these electromagnetic means have been operated by either alternating current or direct current. However, the water systems using magnetic means have only partially treated the water therein and as a result, have not created an absolutely clean and purified water system.

This invention discloses the use of both an alternating current and a direct current magnetic system on opposite sides of a filter means in a water system. The alternating current magnetic means have a vibrating affect on the water which breaks down the particles in the water, kills bacteria, and polarizes the water molecules. The alternating current magnetic means is very effective in breaking down particles in the water such as lime, etc.

The direct current magnetic means effectively polarizes the particles in the water which best effectively serves in "descaling" the pipes. This is accomplished by keeping the particles in suspension. When the particles are kept in suspension, they are not absorbed by the body when water is consumed.

It is, therefore, a principal object of this invention to provide a water system which uses an alternating current magnetic means to break down the partilces in the water in combination with a direct current magnetic means for polarizing the water.

A further object of this invention is to provide a water system which utilizes alternating current and direct current magnetic means wherein the mechanical vibrating effect of the magnets on the water can be selectively adjusted.

These and other objects will be apparent to those skilled in the art.

A BRIEF SUMMARY OF THE INVENTION

A water treatment system is disclosed comprising a first water line communication with a source of water at one end and a water filter on the other. An alternating current magnetic means is imposed in the first water line so that water flowing therethrough will be subjected to the magnetic field thereof. A second water line extends from the water filter to a water outlet means. A direct current magnetic means is imposed in the second water line so that water flowing therethrough will be adjusted to the magnetic field thereof.

The magnetic means are comprised of housing with a magnetic coil mounted therein. Each housing has an inlet and outlet water opening. Oppositely disposed shafts are adjustably secured to the housing and the inner ends thereof terminate in plates which are spaced and which are oppositely disposed. The plates normally are positioned in the proximity of the inlet and outlet water openings.

DESCRIPTION OF THE PREFERRED EMBODIMENT

Figure 1:
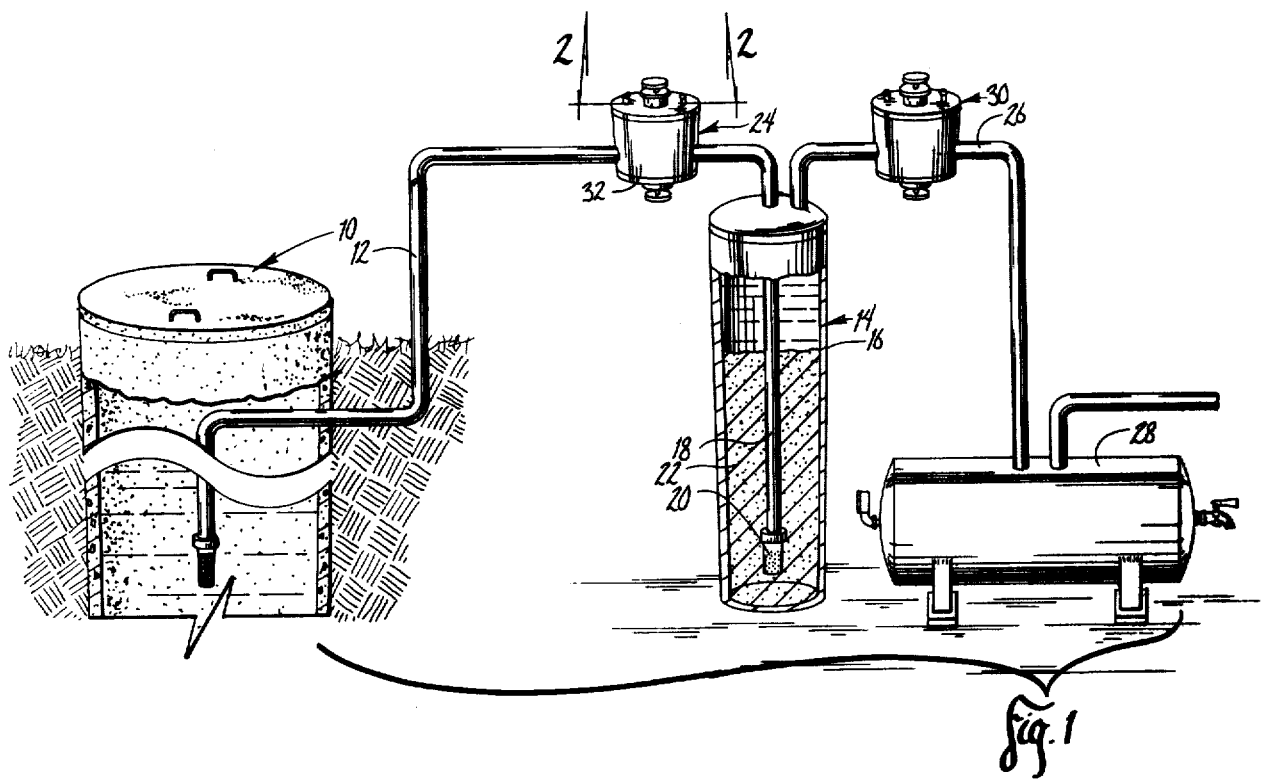
FIG. 1 is a schematic view showing the water treatment of this invention.

The numeral 10 designates a conventional well having a source of water. Inlet line 12 extends from well 10 to a conventional water filter 14. Filter 14 is comprised of a housing 16 which is completely enclosed with top and bottom portions. Inlet line 12 terminates in an inlet tube 18 which extends downwardly through the top of housing 16 and terminates just above the bottom thereof. A screen 20 having a plurality of small apertures therein is secured to the lower end of tube 18. A quantity of solar material, preferably granite (manganese green sand) is located in the bottom of housing 16 and serves to filter the water as it passes upwardly through such material.

An alternating current magnetic device 24 is imposed in inlet line 12 as shown in FIG. 1. An outlet line 26 extends from filter 14 to a pressure tank 28 which is in communication with a water outlet means. Conventional water systems obviously use a pump either at the well or at another location in the water system. The conventional pump has not been shown in FIG. 1.

A direct current magnetic device 30 is imposed in outlet line 26 as shown in FIG. 1. The structure of magnetic devices 24 and 30 are essentially identical, except that the coils thereof are connected to sources of alternating and direct current, respectively.

Each magnetic device 24 and 30 is comprised of an electrically insulating housing 32 having a top 34 and bottom 36. The housing 32 has an inlet opening 38 and an outlet opening 40. An electrical coil 42 is covered with insulation material 44 and is secured by any convenient means to the top 34 of the housing. Watertight terminals 46 extend through top 34 and are in insulated communication with opposite ends of the wire of coil 42.

Figure 2:
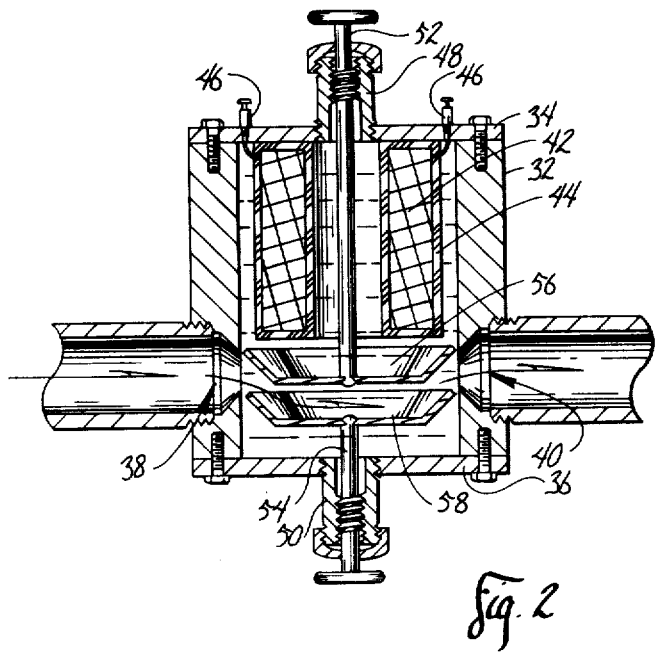
FIG. 2 is a sectional view of the magnetic means of FIG. 1 shown at an enlarged scale and taken on line 2—2 of FIG. 1.
Figure 3:
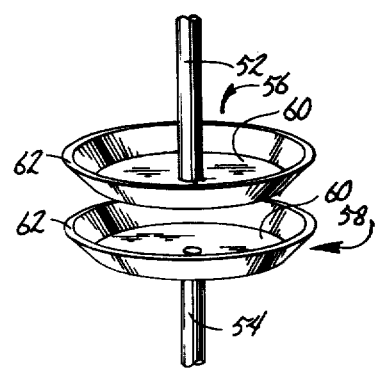
FIG. 3 is a partial perspective view of the plate elements of the magnetic means of FIG. 2.

Bearing caps 48 and 50 are secured to the top 34 and bottom 36, respectively, as best shown in FIG. 2. Shafts 52 and 54, respectively, are threadably inserted through bearing caps 48 and 50. Shafts 52 and 54 have their inner ends secured to plates 56 and 58, respectively. Each plate, as best shown in FIG. 3, is comprised of a flat portion 60 with angular perimeter flange portions 62.

In the normal operation of the device of this invention, the shafts 52 and 54 can be selectively, threadably adjusted in bearing caps 48 and 50, respectively, to adjust the space between plates 60. In the case of the alternating current magnetic device 24, the shafts 52 and 54 pick up vibrations from the housing 32 which are in turn received from the pulsating, alternating current magnetic coil 42. The intensity of the vibrations carried by shaft 52 and imposed on plate 60 is increased as the distance between the plates 60 is decreased. Thus, by varying the distance between plates 60, the vibrational affect on the water passing therethrough can be increased or decreased as desired.

As indicated heretofore, it has been found that the alternating current magnetic device 30 is well adapted to breaking down particles in the water, and the direct current magnetic device 30 is best adapted to polarizing the water and keeping the particles therein in suspension.

From the foregoing, it is seen that the device of this invention will achieve at least its stated objectives.

I claim:

1. A water treatment system, comprising,
   a first water line in communication with means for supplying water at one end and a water filter on the other end,
   an alternating current magnet means for generating a magnetic field and vibrations imposed in communication with said first water line so that water flowing therethrough will be subjected to the magnetic field and vibrations thereof,
   a second water line extending from said water filter to a water outlet means,
   and a direct current magnet means for generating a magnetic field and vibrations imposed in communication with said second water line so that water flowing therethrough will be subjected to the magnetic field and vibrations thereof.

2. The water treatment system of claim 1 wherein said alternating current magnet means include adjustable means to permit adjustment of the intensity of said vibrations and said magnetic field thereof on water passing therethrough.

3. The water treatment system of claim 1 wherein said water filter includes granite sand through which water must pass to move from said first water line to said second water line.

4. An adjustable magnetic water treatment means, comprising,
   a housing having means defining inlet and outlet openings,
   an insulated magnetic coil mounted to and in said housing,
   adjustable means mounted in said housing between said inlet and outlet openings adjacent said coil to restrict the flow of water therebetween, said adjustable means having means defining an opening therein through which said water flows and having means thereon for selectively adjusting the cross-sectional area of the opening therein, said adjustable means picking up mechanical vibrations and a magnetic field from said coil so that said vibrations and magnetic field will be imparted by said adjustment means to water flowing between said inlet and outlet openings.

5. The device of claim 4 wherein said adjustable means include spaced apart first and second plate elements and means for selectively adjusting the space therebetween.

6. The device of claim 5 wherein said plate elements are flat with an angular perimeter flange with said inlet and outlet openings normally in communication with the space defined by the spaced distance between the flanges on said plate elements.

7. The device of claim 5 wherein said coil is hollow and is connected to said housing, a first shaft is threadably secured to said housing and extends through said coil and terminates in said first plate element, said first plate element normally being positioned adjacent said inlet and outlet openings to adjust the flow of water therethrough and to impart said vibrations and magnetic field absorbed from said coil and said housing to such water.

8. The device of claim 7 wherein said second plate element is adjustably secured to said housing opposite to said first plate element and spaced apart therefrom.

9. An adjustable magnetic water treatment means, comprising:
   a housing having means defining inlet and outlet openings,
   a hollow insulated alternating current magnetic coil secured to and in said housing,
   water flow restriction means mounted in said housing between said inlet and outlet openings adjacent said coil to restrict the flow of water therebetween,
   said flow restriction means picking up mechanical vibrations and a magnetic field from said coil so that said vibrations and magnetic field will be imparted by said restriction means to water flowing between said inlet and outlet openings,
   said flow restriction means including spaced apart first and second plate elements and means for selectively adjusting the space therebetween, and
   a first shaft threadably secured to said housing and extending through said coil and terminating in said first plate element, said first and second plate elements normally being positioned adjacent said inlet and outlet openings to adjust the flow of water therethrough and to impart said vibrations and magnetic field absorbed from said coil and said housing to such water.

10. The device of claim 9 wherein said plate elements are flat with an angular perimeter flange with said inlet and outlet openings normally in communication with the space defined by the spaced distance between the flanges on said plate elements.

* * * * *